(12) United States Patent
Trell

(10) Patent No.: US 6,909,382 B2
(45) Date of Patent: Jun. 21, 2005

(54) POLYPHONIC/CHORDIC ANNOTATION METHOD

(75) Inventor: Anders Edvard Trell, Stockholm (SE)

(73) Assignee: Anders Trell Trust, Buffalo, NY (US)

( * ) Notice: Subject to any disclaimer, the term of this patent is extended or adjusted under 35 U.S.C. 154(b) by 635 days.

(21) Appl. No.: 09/902,657

(22) Filed: Jul. 12, 2001

(65) Prior Publication Data

US 2003/0011495 A1 Jan. 16, 2003

(51) Int. Cl.[7] ............................................. H03M 11/00
(52) U.S. Cl. ........................... 341/20; 341/22; 400/485; 379/93.27; 379/368
(58) Field of Search .............................. 341/20, 21, 22; 400/98, 9, 477, 485, 99; 379/93.01, 93.18, 93.27, 368; 345/168, 173

(56) References Cited

U.S. PATENT DOCUMENTS

| | | | | |
|---|---|---|---|---|
| 4,694,280 A | * | 9/1987 | Rollhaus et al. | ............... 341/26 |
| 5,311,175 A | * | 5/1994 | Waldman | ..................... 341/34 |
| 5,424,730 A | * | 6/1995 | Sasaki et al. | ................. 341/25 |
| 5,557,671 A | * | 9/1996 | Endoh | ................... 379/355.01 |
| 6,040,977 A | * | 3/2000 | Hoffer | ........................ 361/680 |
| 6,232,892 B1 | * | 5/2001 | Burrell, IV | .................. 341/22 |
| 6,378,234 B1 | * | 4/2002 | Luo | ............................. 341/22 |
| 6,388,660 B1 | * | 5/2002 | Manser et al. | ............... 345/173 |
| 6,545,668 B1 | * | 4/2003 | Hayama | ..................... 345/172 |

OTHER PUBLICATIONS

Kober et al, submitted to CHI 2001, "Linguistically Optimized Text Entry on a Mobile Phone", 8 pages, Mar. 31–Apr. 4, 2001.
Silfverberg et al, Submitted to CHI 2000, "Predicting Text Entry Speed on Mobile Phones", pp. 9–16, Apr. 6, 2000.

* cited by examiner

Primary Examiner—Timothy Edwards, Jr.
(74) Attorney, Agent, or Firm—Jacobson Holman PLLC

(57) ABSTRACT

A programmatic organisation method, or concept, for augmented use of a standardized keyboard, capable of detecting depression/touching of single keys as well as simultaneously depressed/touched combinations of keys. According to the invention, simultaneous depression/touching of two or more adjacently or non-adjacently located keys of said keyboard is decoded as a predetermined character, symbol, note, action etc., whereby the input capability of the keyboard is considerably enhanced. Advantageously are predetermined functions, e.g. a "shift" ("CAP") or num lock function by predetermined single keys or predetermined key combinations, i.e. the input capability can thus be enhanced even further, each such function resulting in a new and independent input capability The keyboard may advantageously be a conventional numerical 3×4 keyboard.

17 Claims, 3 Drawing Sheets

Figure 1:
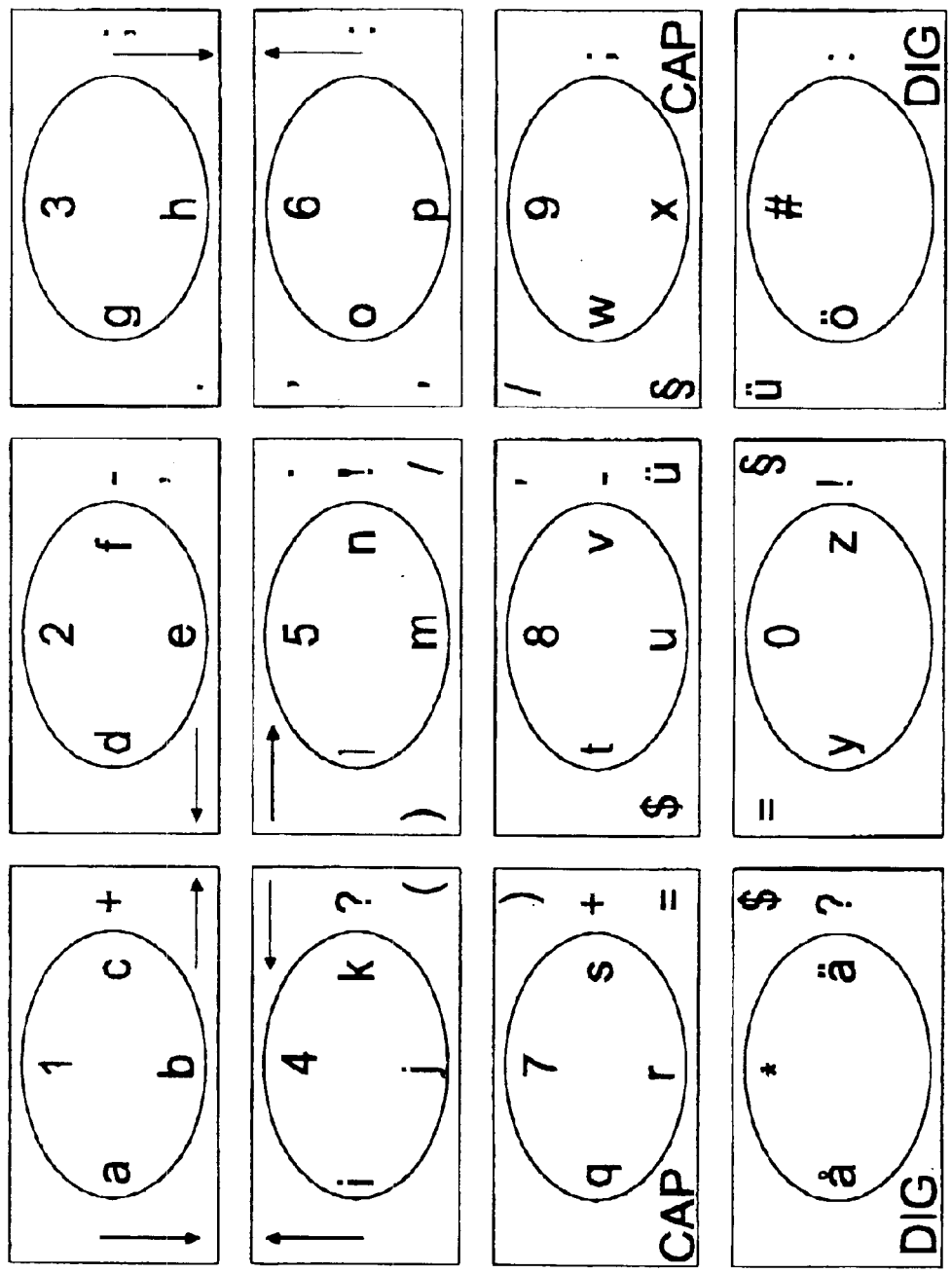

| KEY OR KEY COMBINATION | RESULT |
|---|---|
| 1 | a |
| 1 + 4 | b |
| 1 + 2 | c |
| 2 | d |
| 2 + 5 | e |
| 2 + 3 | f |
| 3 | g |
| 3 + 6 | h |
| 4 | i |
| 4 + 7 | j |
| 4 + 5 | k |
| 5 | l |
| 5 + 8 | m |
| 5 + 6 | n |
| 6 | o |
| 6 + 9 | p |
| 7 | q |
| 7 + * | r |
| 7 + 8 | s |
| 8 | t |
| 8 + 0 | u |
| 8 + 9 | v |
| 9 | w |
| 9 + # | x |
| * | å |
| * + 0 | ä |
| 0 | y |
| 0 + # | z |
| # | ö |
| 7 + 9 | CAP LOCK |
| * + # | NUMBERS |
| 1 + 7 | + |
| 7 + 0 | = |
| 6 + # | : |
| 2 + 6 | , |
| 5 + 3 | . |
| 4 + 8 | ( |
| 5 + 7 | ) |
| 4 + * | ? |
| Etc. | |

*Fig. 2*

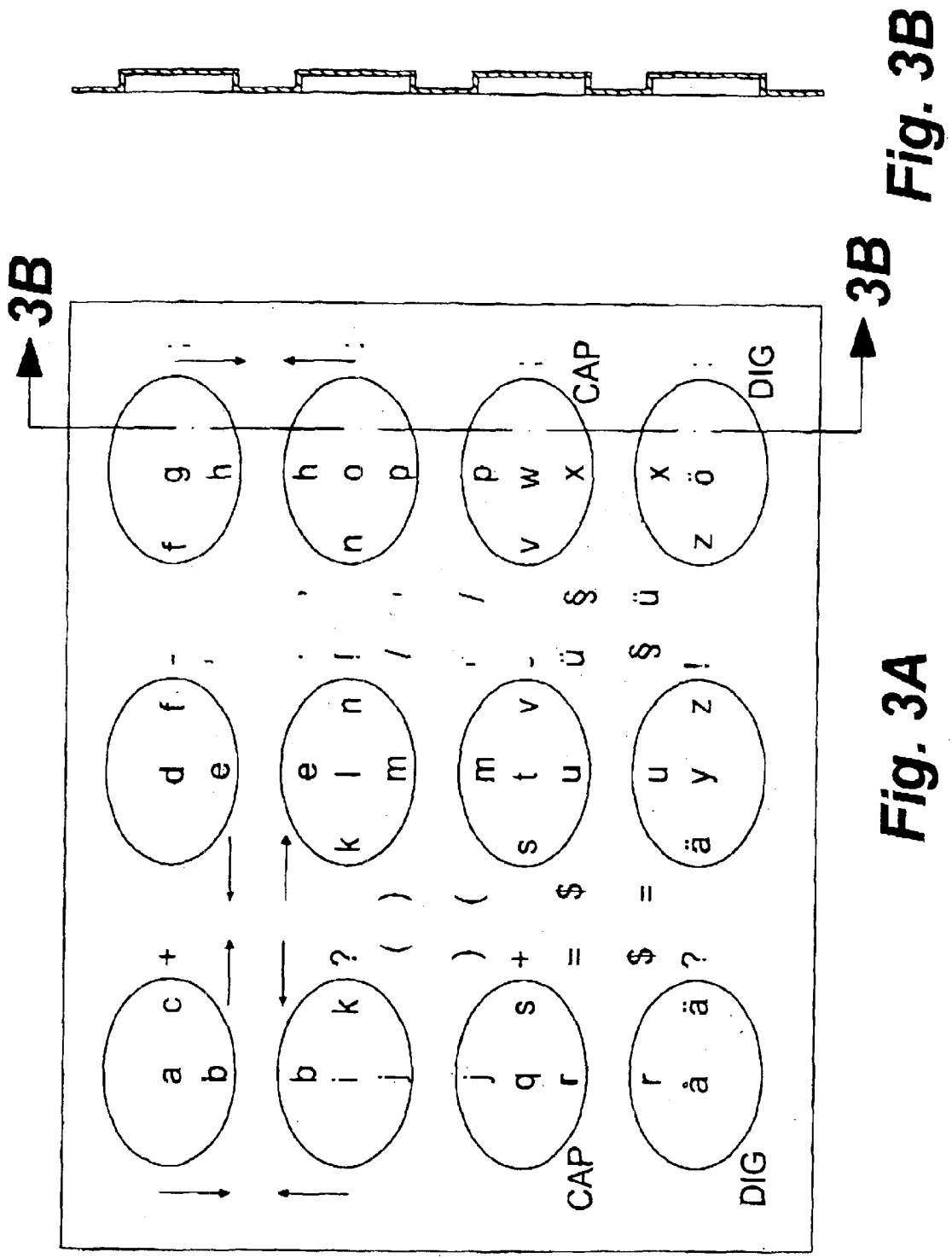

POLYPHONIC/CHORDIC ANNOTATION METHOD

BACKGROUND OF THE INVENTION

A. Field of the Invention

The present invention relates to a novel chordic progression programmatic annotation method or concept, which can be implemented with regard to many types of standardized keyboards and instruments for more pleasing intonation, tuning and recital, with more ease and better tempo, nuance, articulation and phrasing. The term instruments includes all types of devices having a keyboard, for example, mobile phones.

B. Discussion of Related Art

Chordic keyboards have been proposed in replacement of the standard QWERTY keyboard, and are based on the fact that a user can actuate several keys simultaneously to signal a certain symbol to the instrument or device whereto the keyboard is connected. Such chordic keyboards have been given a special design, adapted to the fingers of a user, for example U.S. Pat. No. 4,360,892, 4,442,506 and 4,443,789 to Endfield et al suggests a portable word-processor with a chordic keyboard having four finger keys and at least one thumb key with chord assignment being based on the pictorial relationship of the keys to letters and punctuation marks. Another specifically designed chordic keyboard is disclosed in U.S. Pat. No. 5,993,089 to Burrel, based on the 8-dot Braille arrangement. A dual chordic keyboard is disclosed in U.S. Pat. No 5,493,654 to Gopher et al, comprising two individual and specifically designed co-acting keyboards, each one having seven keys, divided into two groups (three and four keys respectively). A further chordic data input device having an extremely specific shape and location of the input keys is disclosed in U.S. Pat. No. 5,432,510 to Matthews, intended to be operated with one hand only.

All of the above patents are based on the use of specifically designed keyboards, but do not disclose how existing standardized keyboards can be used, e.g. the keyboard of a mobile telephone. There are also other types of keypads used for input of user data which are restricted to numerical data, e.g. entrance surveillance systems, and such systems would obviously be more user friendly, provided that alphanumerical data could be inputted rather than only numerical data.

SUMMARY OF THE INVENTION

The present invention makes use of a conventional keyboard for extended input of information, e.g. a conventional numerical keyboard with 12 keys can be used as a conventional numerical keyboard, but may also be addressed as a chordic keyboard, in which case simultaneous use of two keys makes it possible to input the entire alphabet as well as a large selection of punctuations and other symbols and functions.

With regard to mobile phones, the ability for a user to send text messages (SMS and/or "mobile Internet", "e-mail", etc.) after menu-choice is severely restricted by existing method of input, i.e. each key is singularly associated with a number of letters. For example, with regard to a Swedish mobile phone, the digit "2" may include the following sequence. A, B, C, 2, å, ä, à, á, â, C, Å. This means that "A" can be obtained by depressing the key "2" once only, whereas "Å" would require that the user depresses key "2" eleven times in a rapidly performed operation.

The present invention makes it possible for a user of a mobile phone to enter a full-toned text message etc. in a fraction of the time presently required, and the user can master the chordic keyboard in a minimum of time. The modification required to a mobile phone to accept and interpretate multikey input is minimal, predominantly of programmatic nature, and is easily performed by those skilled in the art. Many keyboards already include a diode matrix or similar, from which the result of multikey operation is readily available.

In a preferred embodiment, the result of various key combinations are disclosed on or adjacent to each key, whereby the result of a combination of adjacently located keys is readily available to a user.

According to a further embodiment, the keyboard can also be used to input musical notes and facilitate phrasing, harmony, beat and tempo. For example, a mobile phone may in fact be operated as a musical instrument, rather than just giving out the tones today associated with each key. The music played can be stored in the memory of the mobile phone (from which it can be downloaded into a PC for further arr.), and may also be displayed as musical notes in the display of the phone.

According to another further embodiment, the concept of the present invention is applied to numerical keyboards as used for entrance surveillance systems, or input of user pin codes etc. in various types of systems. As a result, the level of security is considerably enhanced by chordic addressing. For example, code locks often require input of four digits, and as a result, a close look at the keypad will often disclose the keys that are used frequently, and an unauthorized person may thereby be given the opportunity to find the correct combination by the trial-and-error method, i.e. by combining a small number of frequently used keys in different ways. However, by using the alphanumerical input system according to the present invention, a considerably larger number of keys will be used, thereby making it far more difficult for an unauthorized person to obtain correct code by trial-and-error. Furthermore, alphanumerical input makes it far more easy for a user to remember the required code, even if same should involve more than four characters, since utilized codes can be conventional words, e.g. "attack", "bluebird" etc. By including a "CAP" ("shift") feature, such code words would be even harder to guess, e.g. "attack", "BluEbird" etc. This "CAP" can be occasionally ordered by the user on indicated key(s). However, in many cases menu-choice etc. to enter into alphanumerical mode should not be necessary, since even if the depressed key alone gives both digit (e.g. "1") and letter (e.g. "a") the required alphanumerical code (e.g. in Sweden used ticket booking code format "abc 123 d") itself would decide whether letter or digit was intended at actual code position; and with uncompromised level of security, but simplifying the use. Furthermore, an all numerical code would ignore letters, and a verbal would ignore digits for single keys depressed. This ability of the recipient (man or machine) of a message/code, to selfdeduct what was meant with a single key's depression therein, would in fact, and in a simplest form, make it possible to relatively quick write alphanumerical messages/codes by DTMF:s to call recipients by means of an ordinary telephone, if same is construed thus, that it can bring forth also two (or more) DTMF-digits at same time, and the call recipient is equipped to decode the resulting tonal chords. Such an ordinary telephone would advantageously include a small display unit, e.g. 5–10 characters, showing the inputted characters, and if equipped with a suitable memory for storage of inputted code, the message can be stored off-line prior to establishment of a call. This could also make it possible for a similarly constructed mobile phone to bypass SMS, etc., e.g. downloading a called PC. This is all technically readily achievable, e.g. just by slight changes in the addressing mode and the subsequent reacting of the already existing DTMF-transceivers, automatic dialling circuits, displays, memories etc. of modem telephones (and on the market, e.g. as components), and in the mobile case also by such program changes in the base station that it also can perform such multi-DTMF-s.

A non-restricting example of an embodiment according to the present invention, implemented in connection with the keyboard of a mobile phone, is more fully described below with reference to the accompanying drawings, in which, FIG. 1 shows a plan view of the keyboard, including signs disclosing the result of different key combinations; and FIG. 2 is a table disclosing the result of various key combinations.

FIG. 3A is a schematic top plan view of a keyboard overlay according to the present invention; and FIG. 3B is a section view through line 3B—3B in FIG. 3A.

As disclosed in FIG. 1, a conventional numerical keyboard of a mobile phone includes ten numerical keys (0–9) and two additional keys, "*" and "#" respectively, which herein also will be called "numerical". A mobile phone also includes other keys, such as "Connect", "disconnect" and keys related to a menu system, but in a preferred embodiment, these other keys are not used.

In order to implement the invention, the keyboard must be arranged to recognize and decode simultaneous depression of more than one key, and this can be accomplished in many known ways. As used here, "simultaneous" also includes "arpeggio" or "broken" chords, i.e. a second key is depressed while the foregoing is still in depressed position, giving eventual consonance.

A user enters alphanumerical mode by choosing this from the menu system, and such a choice may, for example, include entries into a telephone book system, entries to be sent as text messages, etc.

When in such a mode, the keyboard will accept chordic entries, and an example of how the keys can be used is shown in FIG. 1. In this particular example, the keyboard can be operated in three modes, alphanumerical, CAP and DIG. When in alphanumerical mode, the "1" key alone results in "a", "1" and "4" results in "b" and "1" and "2" results in "c". In a similar fashion, the "2" key can generate "d", "e" ("2"+"5") and "f" ("2"+"3"), whereas the "rim-key" in this embodiment just gives "g" and "h" ("3"+"6"). The result obtainable from remaining keys can be seen from the letters enclosed within an ellipse at each key.

When a user requires capital letters, the CAP (equivalent to "shift" on QWERTY keyboards) keys ("7" and "9") are depressed simultaneously, and a subsequent letter will be written as a capital letter, i.e. with regard to the keys mentioned above, the "1" key results in "A", "1+4" results in "B" and "1+2" results in "C", etc. Next letter will be small again unless CAP was pressed twice, effectuating "CAP lock", which gives constant capitals, until disenabled by yet another CAP strike.

The user may also require to input numbers and other signs or symbols, and may enter a third and numerical mode be depressing the DIG keys ("*" and "#") simultaneously. In this mode, depression of one key only will result in the normal input result for the keyboard, i.e. "1, 2, 3 . . . 0" and the symbols "*" and "#". Also this mode can be permanented by two DIG strokes; disenabled by yet one more.

In all of the above modes, or if preferred in one or more of the modes, the keyboard can also generate other characters or actions. With regard to the example shown in FIG. 1, this can be exemplified by simultaneous depression of keys "7" and "0" in order to obtain the symbol "=", "#" and "8" to obtain "ü", "5" and "0" to get "1", and "0"and "9" in order to obtain "§". Certain actions can also be accomplished, e.g. "move right" by depressing "1" and "5", "move left" by depressing "2" and "4", "move down" by depressing "1" and "3" and "move up" by depressing "4" and "6".

With regard to the example shown in FIG. 1, it is obviously possible to enhance the number of signs and actions, since only two keys require simultaneous depression in order to obtain the complete Swedish alphabet (capped and non-capped), all digits and numerous other symbols/actions, and also not all possible wider interval two-keys chords have been employed. By increasing the number of simultaneously depressed keys, e.g. allowing combinations of three or more keys, the total number of characters and/or actions (e.g. menu-choice, programming instructions) can be further increased. Such combinations of more than two keys can also be used to represent common words, e.g. "please", "meet", "call", "bye" etc., and such commonly used words, including the name of the user, can advantageously be preprogrammed into the memory of the mobile phone by the user. Preferred such multikey combinations include three adjacently located keys, for example, "1+2+3", "1+4+7", "4+7+*", "1+5+9", "4+8+#", etc., but also other combination can be used, e.g. "1+8+3", "7+2+9" etc.

Combinations of more than three keys are also possible, preferably based on the use of one included common key (e.g. "*" or "#") in order to simplify input However, the number of simultaneously usable keys is related to how close the keys are located and should therefore be related to utilized keyboard type. Furthermore, "broken" chords can be differently interpreted depending on which key is depressed first in a given chord. E.g. 12 is here different from 21, a difference not detectable when the keys are depressed isochronally However, in order to achieve a user-friendly "standard", over-complication should be avoided, at least for not "high security" applications.

The keyboard shown in FIG. 1 is adapted for use in Sweden, and letters, symbols etc. can obviously be adapted to country of use (e.g. cyrillic, greek) or signs/symbols for specific purpose of use (e.g. musical notes and symbols). All or some of peripherally located indications for the result of different two-keys combinations can likewise be altered (e.g. shown on a replaceable key-surrounding shell or an (exchangeable) inscribed membrane) and/or when "CAP" and/or "UDIG" are effectuated, which may widen the gamut of available characters/actions substantially.

The alphanumerical use of a mobile telephone keyboard can also advantageously be combined with speech synthesizing circuits in the telephone, whereby every entry made is stated audibly to the user This would enhance the use to persons having restricted eye sight capability, and would also be of assistance to other users, e.g. when operating the keyboard during mobile conditions.

Other keys, not included in the 3×4 numerical keyboard section, such as "connect", "disconnect" or keys associated with menu choice, can also be given other meaning when the keyboard is used for input of text, symbols or music. Such an alternate meaning may be obtained individually or as combinations of keys. Furthermore, when there is a key arrangement on the keyboard serving as a four coordinates "joystick", same can alone advantageously be used to maneuver the cursor when inputting a message, i.e. to move back or forward, or up and down in the message, and in chordic combination with a numeric key, to give any chosen out of four characters/actions inscribed on that key, which by itself then can give its numerical sign. Thus, if on the "1" key the digit 1 is surrounded by "a", "b", "c" and "d" in a cross configuration resembling that of the four arrows/coordinates of the "joystick", "1" itself gives "1"; "1" + ← gives "a"; 1+ ↓ gives "b"; "1" + → gives "c"; and "1" + ↑ gives "d". All twelve numerical keys can similarly carry four characters each, which may bring the English alphabet to end at key "7" (as "7"+↓), leaving room for twenty two more on-key characters such as "ü", "§", "=" and "!". By e.g. a "shift" ("CAP") command the letters can become majuscules and the symbols can be altered. The earlier herein described move right etc. actions are substituted by the "joystick" itself, and many/all of the other described "peripherally located indications" can move up on-key.

If one especially with mobile phones wants to retain their present labeling standard (where key "2" with "abc" starts the alphabet, and "7" has "pqrs", etc.), it is seen that this is readily feasible; in the joystick case e g. by just arranging the letters suitably around their present digit, optionally filling out vacant positions/keys with more characters, and then write chordically as just above described; and without joystick e.g. thus, that key "2" alone (in writing mode) gives "a", "2"+"5"-chord ="b" and "2"+"3"=c, etc. for keys "4", "5" and "8", key "3" gives "d" and "e" as per key "2" and "f" by "3"+"4", etc. for key "6", key "7" gives (apart from "pqr" as per key "4") "s" by "7"+"#", whereas "y"="9"+"4" and "z"="9"+"*". In this latter case, the earlier herein described "peripherally located instructions" can be retained, and can now unlettered keys carry some wanted extra characters, for chordic take.

Calculators etc. very often have a core of 3×4 numerical key configuration, surrounded or sided by various functional keys, but here, as well known, the numbering orders is somewhat reverse to that of the telephone. Nevertheless, also here alphabetization can be applied according to the herein described chordic concept, starting from either end of the numbering, and which can give some advantages, especially with those calculators, cash registers, fax machines, ATM:s, automates, etc. having a printer, which then also can print out extemporized verbal information, memos, etc.; the numbering order itself of course not being a critical factor Also handheld (industrial) programmers quite often has like keyboard configuration and numbering order, and they too can make good use of the herein described chordic concept, especially since they have regular PC-interface.

Many such programmers, but also some mobile phones (egg. Sony Z5), have a regular 3×4 numerical keyboard layout completed at right side with a vertical row of four "functions" keys to form a standard 4×4 configuration. If these extra keys are employed too in the herein described chordic concept, also keys "3", "6" and "9" could carry three letters each, and could repeat the suggested and preferred chordic pattern from e.g. key "1", and thus the spelling would become all symmetric and homogeneous, and "z" would be reached at key "9" (as "9"+"#", "telephonic" numbering order), leaving room for typically seven more on-key characters.

Already today and certainly with "next generation" (Internet) TV:s, home appliances, car locks, security/alarm panels, etc., there is a need for comprehensive verbal communication and input to such devices, either then by voice commands (which takes much data power), by mobile phones (IR, Bluetooth, etc.), or most plainly by so called remote controls, which two later alternatives are much facilitated by the present invention. It has been shown here how mobile phones can be chordically verbalized, but the herein disclosed method can also advantageously and readily be implemented at quite modest remote controls having a 3×4 core or other standard configuration keyboard core; e.g. 3×3, which just may require some extra two-keys wider interval chords and three letters per key to accomplish alphabetically, and some rearranging of other indications/instructions shown in FIG. 1 to assist in the writing.

According to an embodiment, the keyboard is used to create music, in which case the keys, and combination of keys, are used to create different tones, combinations of tones, and musical effects. The created music can advantageously be stored in a memory, and with regard to mobile telephones, used as an individually created ring signal. Enhanced music input and output capability can be obtained by use of music synthesizing circuitry, as known to those skilled in the art, The popular handheld computers, e.g. Palm™, can also utilize the input method of the present invention. There are foldable QWERTY keyboards on the market, intended to simplify text input. However, even though these keyboards are of a fairly small size when folded together, they are not easy to operate during mobile conditions. According to the present invention, such a handheld computer can be equipped with an integrated or detachably connected small keyboard, e.g. 3×4 keys, possibly a membrane keypad in the cover plate, and such a keyboard, operated according to the present invention, would simplify input of text (and digits) considerably. Most handheld computers are equipped with an serial or parallel interface facilitating connection to a docking unit, and such an interface makes it easy to attach/connect the above mentioned keyboard. Here, as well as at other instruments having a touch-sensitive display, the keyboard can also be virtualized and enacted on the display itself, and then be of enough size for direct finger touch. If the "keys" and indications are displayed semitransparent, the input can be displayed in optimal size at the same time and space. As an alternative, and in particular with regard to handheld computers having a color display, the layout of the keyboard can be shown on the display in one color, e.g. red, and the text entered by a user can be shown in another color.

The present invention, disclosing how the use of a conventional small numerical keyboard can be considerably enhanced, is thus in no way restricted to mobile telephones only, but can be implemented with regard to any small size keyboard, e.g. standard 3×3, 3×4 or 4×4 keys, in order to increase the input versatility of same considerably. Any additional keys available on the keyboard can be used to further enhance the input capability.

One single keyboard can also be used for different purposes, e.g. input of text, numerals and symbols when set in a first mode, and to facilitate input of music when set in a second mode. Different keyboard overlays, as shown in FIGS. 3A and 3B, can be used for each mode in order to assist a user. For example, characters, symbols etc. from various key combinations are disclosed or shown in a preferably detachable keyboard overlay. In addition, various keyboard layout, e.g. numerical, alphanumerical, symbols, musical notes etc. are user selectable from a menu or by depression of one or more predetermined keys. The described embodiment, relating to a mobile telephone, is only intended to disclose the concept of the invention, since the described technique can be used to increase the versatility, security and use of substantially any standardized keyboard as presently used for input of a restricted number of characters, normally numerical characters. Consequently, the other herein mentioned embodiments/applications should be seen as illustrating rather than restricting the invention.

Accordingly, the present invention is in no way restricted to the preferred example of an embodiment described with reference to a mobile telephone, since the concept of the invention advantageously and readily can be used in connection with many other systems, requiring user input.

The method or concept of the present invention will no doubt also increase business and sales of a large number of devices, e.g. handheld computers would appeal to a larger group of consumers provided that input of characters could be made in a fast and easy way via a small sized keyboard, rather than with use of a pen or an unfolded fairly large keyboard. The possibility of increased sales also apply to other types of devices, and as disclosed would mobile telephones and conventional telephones be able to accept input of text messages in a simple and fast fashion that would appeal to users. The disclosed method may therefore also be regarded as a business method, since same would result in increased business for a large number of different types of devices.

What is claimed is:

1. A programmatic organization method for chordic input by using a standardized keyboard with an enhanced input capability arranged capable of detecting depression/touching of single keys as well as simultaneously depressed/touched combinations of keys, wherein simultaneous depression/touching of two adjacently located keys of said keyboard is decoded as a predetermined input in a chosen input mode; and wherein the chosen mode is obtained by simultaneously depressing/touching predetermined combinations of keys that are separated by one key.

2. The method as claimed in claim 1, wherein the chosen mode is obtained by predetermined single keys.

3. The method as claimed in claim 1, wherein the keyboard forms a part of an input system utilized for user verification.

4. The method as claimed in claim 1, wherein data input is shown on a display unit.

5. The method as claimed in claim 1, wherein data input is made audible to a user by music or speech synthesizing circuits.

6. The method as claimed in claim 1, wherein resulting characters, symbols etc. form various key combinations are shown adjacent to each key of the keyboard.

7. The method as claimed in claim 1, wherein resulting characters, symbols etc. from various key combinations are disclosed or shown in a preferably detachable keyboard overlay.

8. The method as claimed in claim 1, wherein a joystick function is participating in the inputting of data.

9. The method as claimed in claim 1, wherein various keyboard layout, including numerical, alphanumerical, symbols, are selectable from a table.

10. A method as claimed in claim 1, wherein various keyboard layout, including numerical, alphanumerical, symbols, are user selectable by depression of one or more predetermined keys.

11. The method as claimed in claim 1, wherein simultaneous depression/touching of two adjacently located keys numbered "1" though "9" of said keyboard is decoded as a predetermined input in a chosen input mode.

12. The method as claimed in claim 1, wherein the keyboard is a conventional numerical 3×4 keyboard, covering "0" through "9" and including up to two additional keys.

13. The method as claimed in claim 12, wherein the keyboard includes at least one further key.

14. The method as claimed in claim 1, wherein the keyboard forms a part of a telephone, including preferably a mobile telephone.

15. The method as claimed in claim 14, wherein the telephone is capable of inducing/outputting more than one DTMF-digit simultaneously.

16. A telephone instrument capable of generating and outputting more than one DTMF-digit simultaneously, said instrument comprises, a standard keyboard with an enhanced input capability arranged capable of detecting depression/touching of single keys as well as simultaneously depressed/touched combinations of keys, wherein simultaneous depression/touching of two adjacently located keys of said keyboard is decoded as a predetermined input in a chosen input mode; and wherein the chosen mode is obtained by simultaneously depressing/touching predetermined combinations of keys that are separated by one key.

17. A handheld computer having a standard numerical keyboard as an attached or integrated member, single key and simultaneous adjacent two-key user input being decoded as numerals, characters, symbols according to predetermined keyboard layouts.

* * * * *